Figure 1:
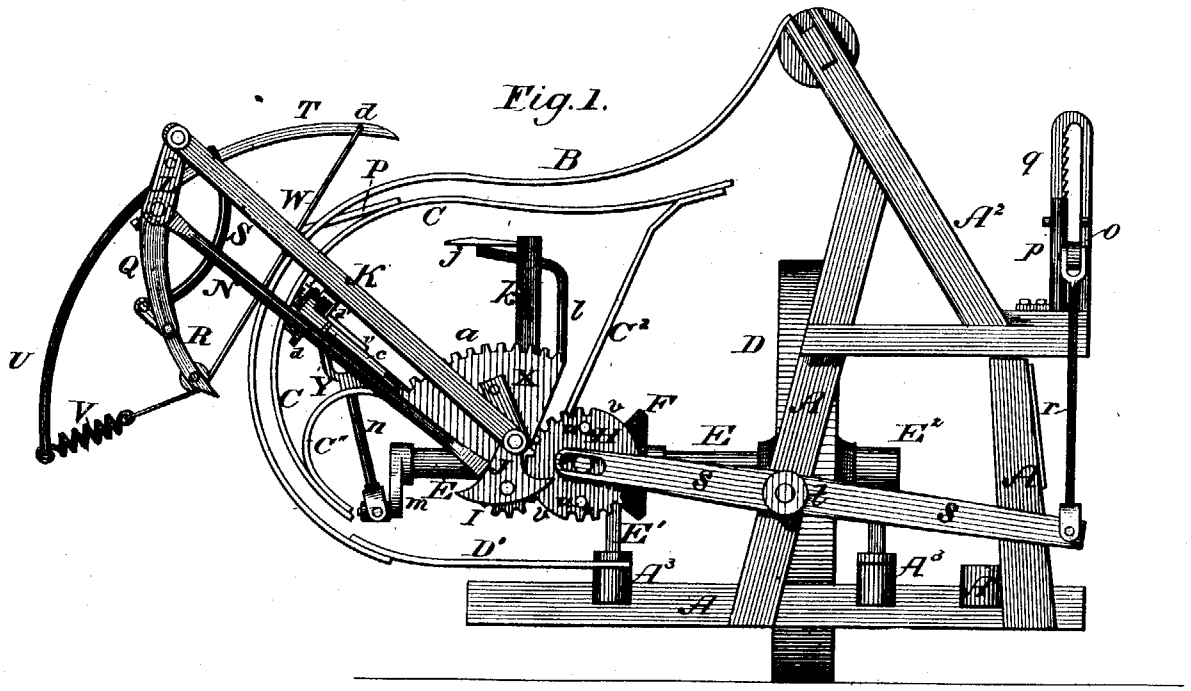

58. HARVESTERS 45-3

BEST AVAILABLE COPY

6 Sheets—Sheet 1.

D. McPHERSON.

Assignor to THE McCORMICK HARVESTING MACHINE CO.

GRAIN BINDER.

No. 10,003. Reissued Jan. 3, 1882.

Attest.

Sidney P. Nollingsworth

Herbert D. Blakemore.

Inventor.

Daniel McPherson

By Parkinson & Parkinson

Attys

N. PETERS, Photo-Lithographer, Washington, D. C.

56. HARVESTERS
453

D. McPHERSON.

Assignor to THE McCORMICK HARVESTING MACHINE CO.

GRAIN BINDER.

No. 10,003. Reissued Jan. 3, 1882.

*Attest.*

Sidney P. Hollingsworth.

Herbert D. Blakemore

*Inventor.*

Daniel McPherson

By Pancoast & Pancoast

*Attys.*

N. PETERS, Photo-Lithographer, Washington, D. C.

56. HARVESTERS.
453

6 Sheets—Sheet 3.

D. McPHERSON.

Assignor to THE McCORMICK HARVESTING MACHINE CO.

GRAIN BINDER.

No. 10,003. Reissued Jan. 3, 1882.

*Attest.*

Sidney P. Hollingsworth

Herbert D. Blakemore

*Inventor.*

Daniel McPherson

By Parkinson & Parkinson

*Attys.*

N. PETERS, Photo-Lithogr., Washington, D. C.

56. HARVESTERS.

423

6 Sheets—Sheet 4.

D. McPHERSON.

Assignor to THE McCORMICK HARVESTING MACHINE CO.

GRAIN BINDER.

No. 10,003. Reissued Jan. 3, 1882.

Attest.

Sidney P. Hollingsworth.

Herbert D. Blakemore

Inventor:

Daniel McPherson

By Pennington & Pennington

Attys.

N. PETERS, Photo-Lithographer, Washington, D.C.

56. HARVESTERS.
453

6 Sheets—Sheet 5.

D. McPHERSON.

Assignor to THE McCORMICK HARVESTING MACHINE CO.

GRAIN BINDER.

No. 10,003. Reissued Jan. 3, 1882.

Attest.

Sidney P. Hollingsworth.

Herbert D. Blakemore.

Inventor.

Daniel McPherson

By Rancinson and Rancinson

Attys.

N. PETERS, Photo-Lithographer, Washington, D. C.

56. HARVESTERS
45-3

6 Sheets—Sheet 6.

D. McPHERSON.

Assignor to THE McCORMICK HARVESTING MACHINE CO.

GRAIN BINDER.

No. 10,003. Reissued Jan. 3, 1882.

Attest.

Sidney P. Hollingsworth.
Herbert D. Blakimore.

Inventor.

Daniel McPherson
By Parkinson & Parkinson
Attys.

N. PETERS, Photo-Lithographer, Washington, D. C.

UNITED STATES PATENT OFFICE.

DANIEL McPHERSON, OF CALEDONIA, N. Y., ASSIGNOR TO THE McCORMICK HARVESTING MACHINE COMPANY, OF CHICAGO, ILLINOIS.

GRAIN-BINDER.

SPECIFICATION forming part of Reissued Letters Patent No. 10,003, dated January 3, 1882.

Original No. 183,813, dated October 31, 1876. Application for reissue filed May 28, 1881.

*To all whom it may concern:*

Be it known that I, DANIEL McPHERSON, of Caledonia, Livingston county, State of New York, have invented new and useful Improvements in Binders for Harvesters, of which the following is a specification.

The object of this invention is to simplify and improve the construction and operation of automatic or self-binding attachments to harvesters, and it is more particularly adapted to the use of wire for bands; but many of its parts may be usefully employed in the construction of cord-binders.

The improvements consist in mounting the binder-arm or needle upon a rocking frame or support and causing it to rock inward toward or over the grain-table, descend, carrying the band around the gavel, which it separates from the incoming stream of grain, and then rock outward and discharge the bound bundle; in mounting the binding-arm and band-securing mechanism to rock in unison, and so actuating them that the gavel is gathered and encircled by the descent of the binder-arm at the end of the inward traverse, and the ends of the band united by the operation of the band securing mechanism as the arm is pushing the gavel before it and toward the discharging-point on the outward traverse; in a compressor of improved construction to compress and give form to the bundle and to relieve the band and band-applying devices of this duty and of the strain incident thereto; in mechanism for causing the needle or binder-arm and compressor to act upon the grain; in arranging and causing the pinion of the band-fastening devices to be rotated by a toothed surface concentric with the axis of movement of the swinging support of the binder-arm or needle; in mounting the binder-arm or needle and the band-fastening devices upon a common supporting bar or frame adapted to be rocked to vary the relation of said parts to the binding-table for the purpose of applying the band at the proper point to varying lengths of grain; in means for rocking said support or frame; in a supplemental receiver arranged to rock with the binding mechanism; in a stop or abutment to prevent the bound bundle from moving inward with the needle or binder-arm, and to insure its proper delivery from the machine; in the mechanism by which the various movements are produced and controlled, and in details and combinations hereinafter explained.

Figure 2:
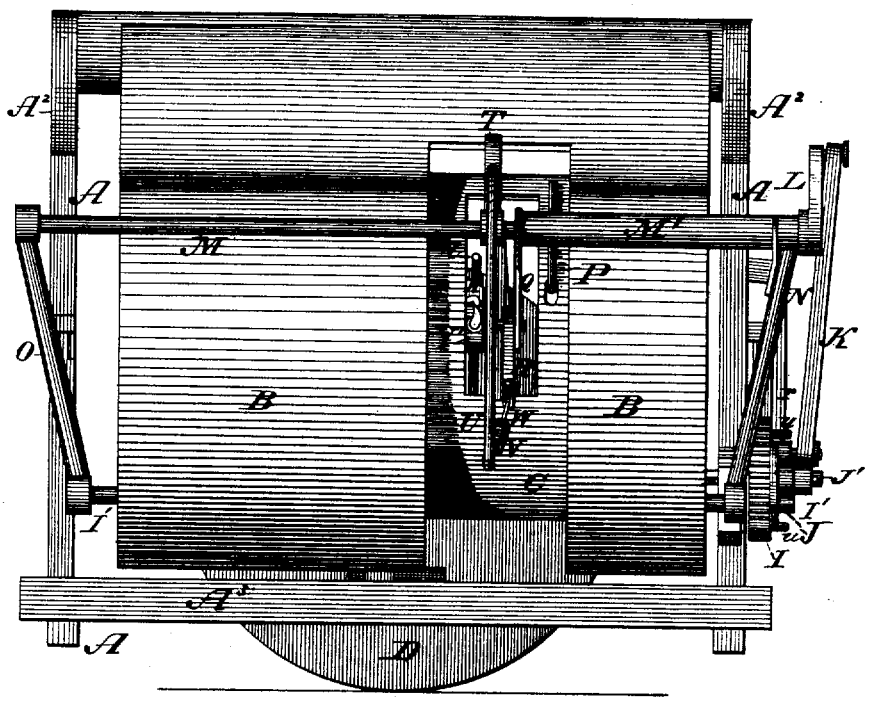
Figure 3:
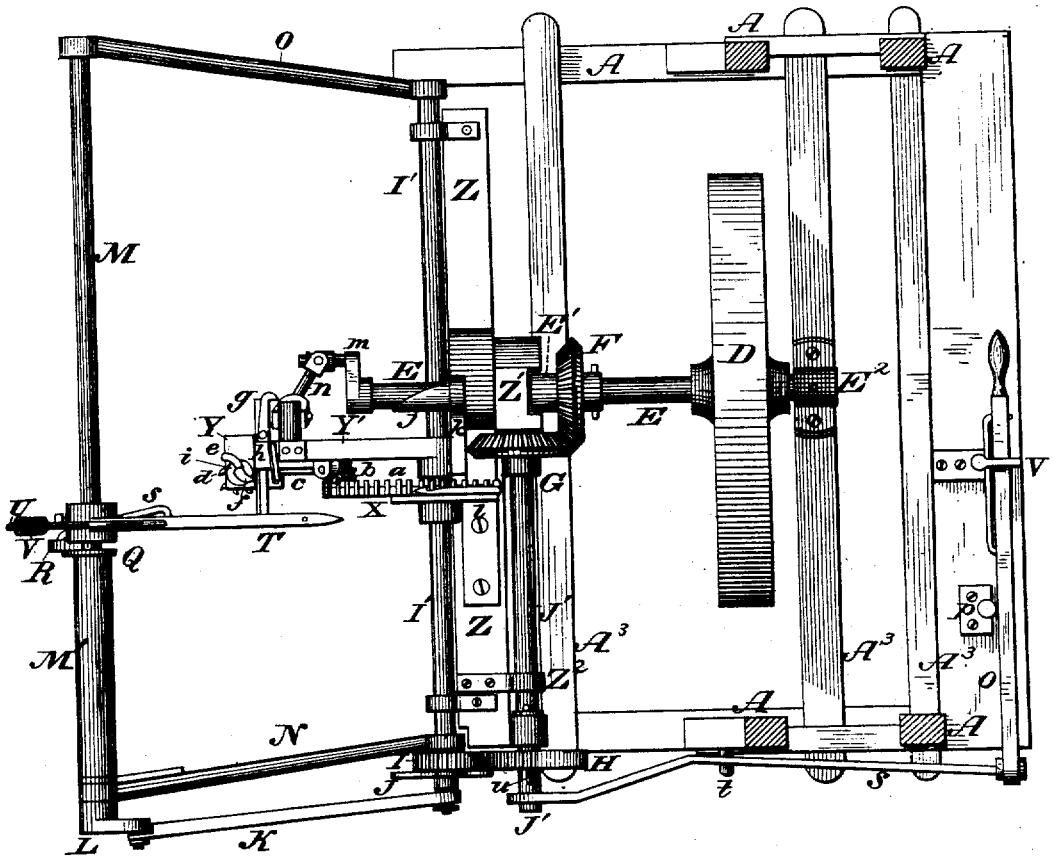
Figure 4:
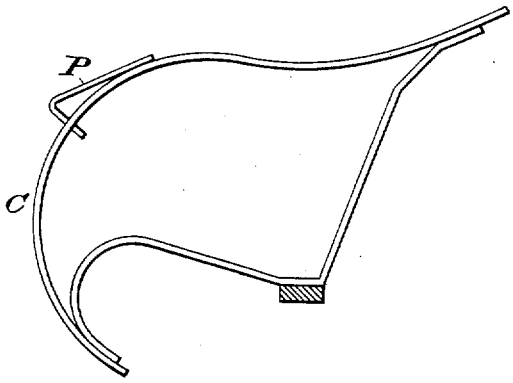
Figure 5:
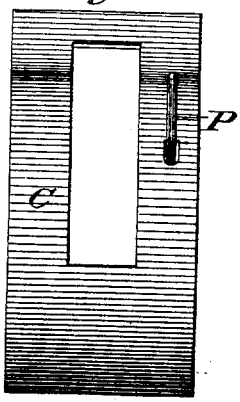
Figure 16:
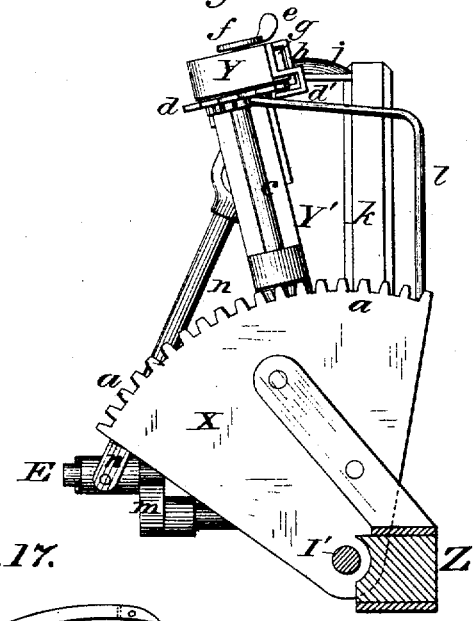
Figure 17:
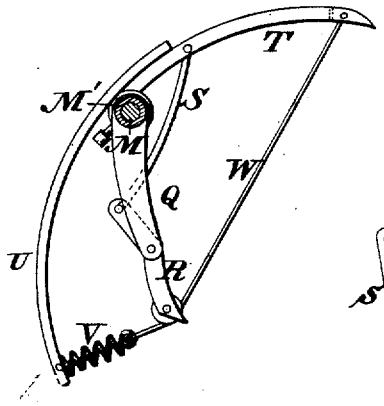
Figure 18:
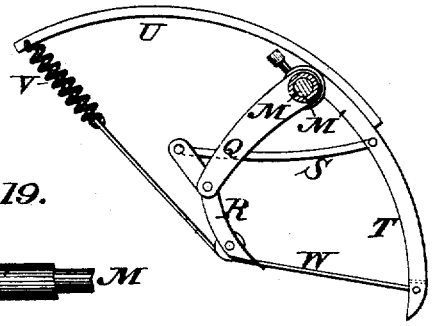
Figure 19:
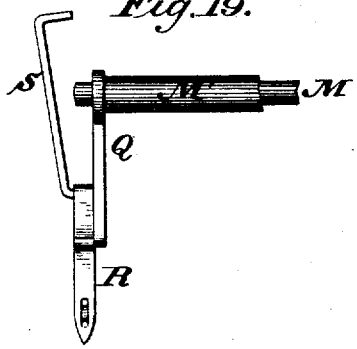
Figure 20:
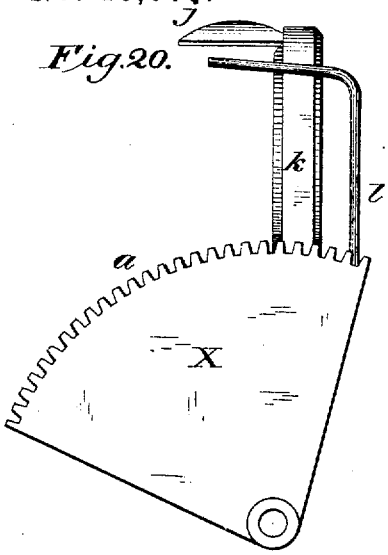
Figure 22:
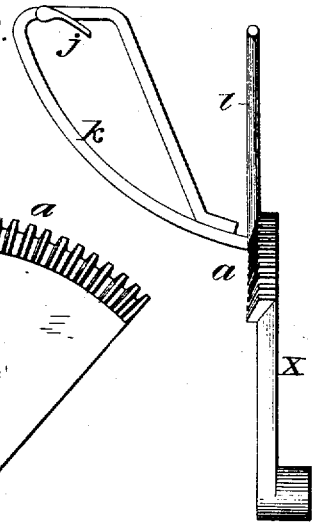
Figure 21:
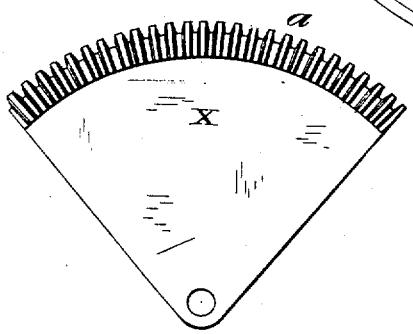
Figure 26:
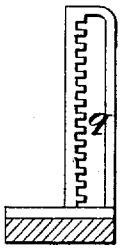
Figure 23:
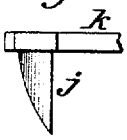
Figure 24:
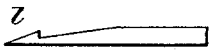
Figure 25:
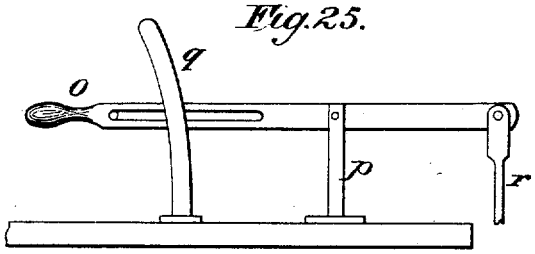

In the accompanying drawings, Figure 1 is a front elevation of a harvester provided with my improved binding attachment, the harvester being partially broken away; Fig. 2, a side elevation; Fig. 3, a plan view with the receivers removed; Figs. 4 and 5, respectively, edge and face views of the secondary receiver; Figs. 6, 7, 8, 9, and 10, views illustrating details of the twisting and holding devices; Figs. 11, 12, 13, 14, and 15, views showing details of the devices for operating the needle or binder-arm frame; Fig. 16, a detached view of the sector with the twisting devices in their forward position; Figs. 17, 18, and 19, views illustrating details of the compressing devices; Figs. 20 and 21, front and rear views of the sector; Figs. 22, 23, and 24, detail views of the devices attached to the sector; Figs. 25 and 26, detail views of the lever by which the position of the binder-frame is adjusted.

The binding attachment herein described is designed to be applied to a harvesting-machine provided with a grain carrier and elevator, which may be of any of the forms now in use, and are therefore not shown or described, and the frame-work will be constructed in any suitable manner for such purpose.

Referring to the drawings, A A′ $A^2$ $A^3$ represent the frame-work of a harvester, of which the part $A^2$ may be used as a part of an elevator-frame, over which the grain would be delivered to a fixed receiver, B, constituting the binding table or platform. For convenience of description such a construction will be understood.

The harvester frame may be sustained or supported upon the axle E of the main wheel D by hangers or brackets E′ $E^2$, provided with journals, as shown, or in any other suitable manner.

The grain, as it is delivered into the receptacle or binding-table B, is encircled and bound, the gavel being separated from the incoming stream of grain by a needle or binder-arm, T, which swings inward over the receiver, descends through the grain, carrying the band about the same and to the fastening devices beneath the receiver, and then swings outward, pushing the gavel before it, and finally discharging it as a bound bundle from the machine. To permit these movements of the needle or binder-arm, the latter is carried by a swinging support or frame, consisting of a shaft, M, upon which the needle or arm T is rigidly secured, rods N O, in the outer ends of which said shaft is journaled, and a shaft, I′, by which said arms are carried, and which rocks in bearings upon a beam or cross-bar, Z, supported upon the harvester. This swinging or rocking frame is advanced and withdrawn to carry the binder-arm in and out over the grain-receptacle by means of a crank, *m*, at the end of the axle E, connected through a pitman, *n*, having swiveled or jointed couplings at its ends, with a post, Y′, firmly attached to the rock-shaft I′, carrying the arms or uprights N O of said frame. As the post is lifted by the pitman *n*, the frame, carrying with it the needle or binder-arm, is advanced, and it advances or recedes according to the revolution of the crank *m*, the binder-arm being raised at the end of its outward traverse and held in its raised position to clear the grain in the receptacle during the inward traverse, then, at the end of the latter, caused to descend to pierce the stream of grain and separate the gavel therefrom, and held in its depressed position during the outward traverse by mechanism which will be hereinafter described.

It is found in practice that when the bundle is compressed by the binding wire very strong devices are necessary for holding the wire for that purpose, and the difficulty of cutting and twisting is greatly increased. For this reason I compress the bundle into shape by a separate and distinct mechanism, so as to avoid the strain on the binding-wire necessary for that purpose.

The shaft M of the swinging frame is provided with a collar or sleeve, M′, carrying an arm or bracket, Q, and permanently attached to the arm or bar N to prevent turning, and upon this collar or tube the spool or reel is placed when the machine is assembled for use. At the end of the arm or bracket Q there is pivoted a bar or compressor-arm, R, the upper arm of which is connected by a link or rod, S, with the binder-arm or needle, while its lower end is perforated, as indicated.

The binder-arm or needle T is firmly attached to the shaft M, as shown, and is extended backward to the rear thereof, either by a separate bar, U, or, if desired, by an integral continuation or extension of the arm. At the lower end of the bar U is permanently attached a spring, V, to which spring and to the front end of the needle a cord or wire, W, is secured, said cord or wire passing in its course from the spring to the needle through the eye in the pivoted arm R, which may be provided, if desired, with an anti-friction wheel to prevent the wearing of the cord. The rod or link S being pivoted to the binder-arm or needle T and to the upper or heel end of the bar or compressor-arm R, and the arm Q being relatively stationary, the depression of the binder-arm or needle T at the end of its inward stroke or traverse will advance the lower end of the bar or compressor-arm, so as to bring the points of support of the compressing-cord W up to the sides of the bundle, around which said cord at the time extends from the arm R to the point of arm T, in which position the bar or compressor-arm remains until the bundle is bound and carried back ready to be discharged, when it again opens or returns to the position shown in Fig. 1 with the rise of the binder-arm. By thus compressing the bundle by a separate device, but very little strain comes upon the binding-wire, so that it can be held in position with a slight gripe and twisted without the difficulty heretofore encountered when the binding material was used as a compressor.

The spring V prevents the device from being too rigid and enables it to adapt itself to different-sized bundles, so that it will properly compress either large or small bundles, and so that all sizes of bundles will be bound with about the same compression and give the binding material about the same strain in each.

In order to give the needle or binder-arm T a positive movement to raise or depress it, as the case may be, at the termination of its outward and inward traverse, and to apply sufficient force to the compressor as the needle or arm passes around the bundle, the shaft M, upon which the needle is secured, is furnished with a crank, L, connected by a pitman, K, with a crank-plate, J, carried upon the shaft I′, upon which the needle or binding arm frame or support rocks, the plate J being formed with two spurs or points and controlled and actuated by other parts during the movements of the rocking frame with the needle or arm. As the frame swings inward the pivot of the pitman K, or its point of connection with the plate J, is above that of the rocking frame, causing the needle to be elevated, the pitman passing to or slightly beyond a vertical position over its pivot. The shaft I′ has also running loosely thereupon a pinion, I, driven by a wheel, H, on a parallel shaft, J′, which is carried in bearings Z′ Z² on the bar Z, and is in turn driven by miter-wheels F G from the axle E. The wheel H has two blank spaces or sections, as shown at *v*, Figs. 1 and 13, and two sections of teeth. At the commencement of each toothed part there are side projecting pins *u*. These pins engage alternately with the points of the plate J, which plate is attached to the pinion I, so as to move therewith, and has the pitman K pivoted to it at a distance from its own pivot or axis of movement.

As the wheel H is revolved by means of the miter-wheel G, and as the rocking frame nears the termination of its inward stroke from the position shown in Fig. 1, one of the pins *u* strikes the projecting point of the plate J, revolving the plate and drawing the pitman K forward or downward until the pin passes the point, when the motion is continued by the intermeshing of the teeth of the wheel with those of the pinion I, to which the plate J is firmly attached, as above stated. This imparts a downward movement to the binder-arm T, continuing until the needle is brought close against the tying-head or band fastening devices and the rocking frame is about to start on its return-stroke, at which moment one of the blank sections *v* of the wheel H reaches a blank space, *w*, of the pinion I, made by leaving out two or three of the cogs, and locks therein, so that the needle is held and remains in its depressed position during said return-stroke and until the second pin strikes the opposite projection of the plate J, when the crank L is elevated and the parts are again in the position from which they started.

By cutting out the sections *v* of wheel H the pinion I may be left entire; but to insure uniformity and certainty in the action I prefer to make the wheels as described.

Figure 6:
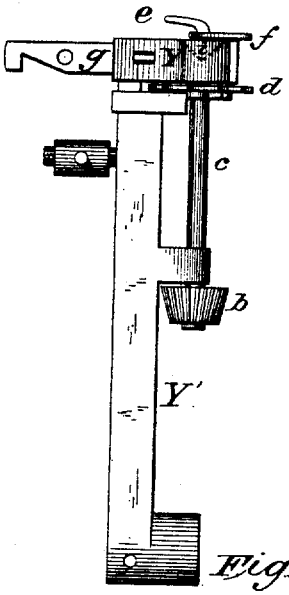
Figure 7:
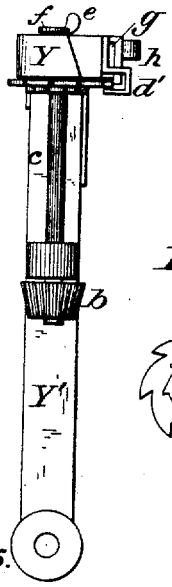
Figure 8:
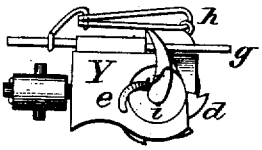
Figure 9:
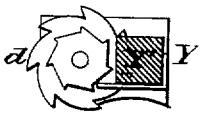
Figure 10:
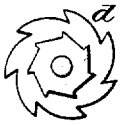
Figure 11:
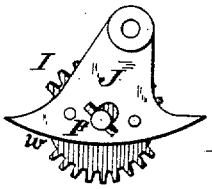
Figure 12:
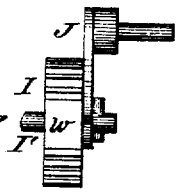
Figure 13:
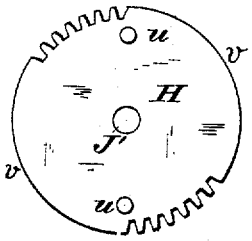
Figure 14:
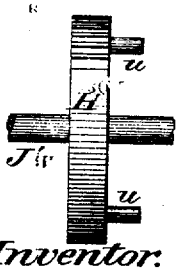
Figure 15:
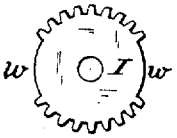

The post Y′ is provided with or carries the band fastening or twisting devices, which are operated by a toothed rack concentric with the axis about which said post moves. These devices consist principally of a rotating twisting hook or finger, *e*, fast upon a shaft, *c*, provided with a pinion, *b*, a clamping-wheel or holder, *d*, mounted upon said shaft as a pivot, a cutter, *f*, fast to the shaft, like the twister, and located a short distance behind the latter, so as to follow it and cut the ends of the wire behind it after they have been grasped in the twisting movement, and a bar or gate, *g*, sliding in ways in the head Y and pressed forward by a spring, *h*, into a normally-closed position to cut off the access of the wire to the twister. As the post moves inward and outward the pinion *b* is made to revolve by the teeth of the curved rack X, described upon an arc concentric with the axis of movement of the rocking frame and post, and carried by or mounted upon the bar or beam Z, which teeth in the outward movement of the post drive the twisting and cutting devices in the proper direction for their purpose. As the post nears the limit of its inward movement the pitman K, operating upon the crank L and operated by the crank-section of the plate J, as above described, depresses the needle or binder-arm T, and causes it to pass through the opening of the receiver and to come in contact with the tying or twisting devices in the head Y. The advance or inward movement of the parts also brings the opening of the spring bolt, bar, or gate *g*, for holding the wire out of the twister while it is passing over the sector, in contact with the incline *j* on the post *k*, which draws the bar back and permits the wire at the proper moment to pass it and enter the twister. Near the farthest point of advance of the post Y one of the projections or teeth of the clamping-wheel *d* comes in contact with a bent post or stop, *l*, which causes the wheel to turn one step, in which position it remains, being held by the spring or click, as shown in Figs. 6 and 9, acting upon the teeth of a ratchet-wheel secured to the under side of the clamping-wheel until the succeeding inward stroke or advance is made, when it is moved another step, and so on, for the purpose of folding the spool or reel end of the wire against or into a shoulder or loop, *d′*, so it will pay off from said reel as it comes against and is carried around the gavel.

The head Y of the tying or twisting device is provided with a concave, *i*, in which the twisting device revolves. The twister *e* lies close against the surface of this concave opening, and consequently snubs the band ends of the wire thereagainst as it gathers them in, and holds them after they have been severed from the spool portion and while they are being twisted together. The cutter *f*, moving in unison with and close behind the twister, severs the band ends from the spool portion immediately after they have been snubbed, leaving the end of said spool portion securely held by the clamping-wheel, which has by this time grasped it, as above explained.

It is desirable that the gavel should be bound as near the middle as practicable, and as grain varies in length no rigid fixture can bind the different lengths suitably. For this reason the cross-bar Z is pivotally supported upon the axle E of the main drive-wheel D, near the bracket or support E′, and to this cross-bar the binding-devices are attached. At the side of this balanced bar Z are attached the journal-bearings of the shaft J′, and they are so arranged that the wheel G will retain its proper gear in whichever direction the bar Z may be tilted.

The tilting of the bar is controlled by the lever *o*, which is located conveniently to the driver's seat, and moves in a guide-post, *q*, provided with notches or catches to receive a dog from said lever and retain it in any adjusted position until intentionally disturbed. As the outer end of the lever is depressed it depresses the end of the lever *s*, with which it is connected by the link *r*, and thereby raises the front end of the bar Z, through the shaft J′, to which the lever *s* is in turn connected, as shown in Figs. 1 and 3. This throws the binding devices back for binding long grain.

When the grain is short the operation of the lever *o* and the other parts is reversed, which throws the binding devices forward, thus making the operation of binding long or short grain easily adjustable by the driver, who can shift the device from time to time as the various growths of straw may require.

If the binding apparatus were permanently fixed in any given position, the receiver B would be sufficient for all the purposes of receiving the grain; but as said devices are made adjustable I have made a large opening, as shown, in the receiver B, and placed immediately below this a secondary receiver, C, which is provided with an opening only sufficient for the operation of the binding devices. This secondary receiver is permanently attached to the tilting bar Z, and it moves from side to side of the large opening in the receiver B, according to the tilting of said bar, maintaining at all times the same relation to the binding devices. The secondary receiver serves to close the large opening in the main receiver, and to immediately cover the band holding and uniting mechanism. The main receiver is carried sufficiently far around to protect the tying devices and to insure the delivery of the bundles upon the ground. It is supported at its lower end by the bars D′, attached to the main frame at $A^3$.

The bars D′ may, if desired, be considerably longer, and thereby shorten the closed portion of the receiver B, which may also, if desired, be made in strips its entire length instead of closed, as shown, and it may be considerably shorter.

The secondary receiver should be made to fit as close against the main receiver as is practicable and not interfere with its tilting. The secondary receiver is provided with a spring-bar, P, which springs down as the bundle passes over it, and returns to position as soon as the bundle has passed, thereby preventing the return of the bundle or its sticking, so as to interfere with the compressor or other parts of the machinery.

In operation, as the machine is drawn along the cut grain is delivered by means of an elevator over on the receiver B. As the machine advances the crank *m* tilts the frame upon which the compressing-arm and the needle or binder-arm T are supported, and moves it forward or inward to position, when the plate J and wheel I operate to drive the needle through the accumulated grain and bring it down and around to the twister. The wire or cord W, passing over the grain, acts as a compressor, and, with the described operation of the bar or compressor-arm R, brings it into compact shape for binding. The binding-wire passes from the reel on the sleeve M′, through the opening or eye near the point of the needle, to a point just below the head Y, then up past the uniting mechanism and around the gavel to the holder, as will be understood. As the head comes in contact with the arm *l* the spur-wheel *d* advances one step and catches the strand of wire from the needle and holds it over one of its projections in the form of a loop. The crank *m* having now passed its dead-center, the rocking frame begins to move back toward the outer side of the machine. The first movement of the twisting-finger [illegible]ged by the engagement of its pinion with the [illegible] grasps the ends of the wires and holds them by friction between said finger and the conc[illegible] *i* of the head Y, immediately succeeding which they are cut by the blade *f*. Then, the revolution of the twister continuing, the bundle is brought to its discharge-point and the binding-arm rises for its return-stroke. The binding-wire being looped over the point of the wheel *d* as the compressor and needle recede therefrom, sufficient wire is drawn out for the next bundle which is gathered on the succeeding inward movement, the operation being repeated at each revolution of the main wheel.

I claim as my invention—

1. In a grain-binder, the combination of a binding-table which receives the grain, a binding-arm supported upon a vertically rocking frame, and means whereby the binding-arm is positively depressed to pierce through the stream of grain and divide off and encircle the gavel as the rocking frame reaches the termination of its inward traverse and held in its depressed position during the outward traverse.

2. In a grain-binder, the combination of a binding-table which receives the grain, a pivoted frame rocking toward and from the delivery-point of the harvester, a binding-arm fast to a cranked rock-shaft carried by said frame, and mechanism positively actuating said rock-shaft to depress the binding-arm at the termination of the inward traverse of the rocking frame and lock it during the outward traverse.

3. In a grain-binder, the combination of a binding-table which receives the grain, a pivoted frame rocking toward and from the delivery-point of the harvester, a binding-arm carried by said frame, and means positively actuating said binding-arm to depress it at the termination of the inward traverse of the rocking frame and raise it at the termination of the outward traverse, and to lock it in its depressed or raised position during the intermediate movements of said frame.

4. In a grain-binder, the combination of a binding-table which receives the grain, a frame rocking on a horizontal pivot, a binding-arm carried by said frame, band-securing mechanism, also carried by said frame, and means whereby the binding-arm is brought down alongside the band-securing mechanism at the termination of the inward traverse of the frame to deliver the band material to said mechanism.

5. In a grain-binder, the combination of a binding-table which receives the grain, a frame rocking on a horizontal pivot, a binding-arm carried by said frame, band-securing mechanism, also carried by said frame, and means whereby the binding-arm is caused to descend to the band-securing mechanism at the termination of the inward traverse of the frame and held alongside thereof during the outward traverse.

6. In a grain-binder, the combination of a binding-table which receives the grain, a frame rocking on a horizontal pivot, a binding-arm carried by said frame, band-securing mechanism, also carried by said frame, means whereby the binding-arm is caused to descend to the band-securing mechanism at the termination of the inward traverse of the frame and locked alongside thereof during the outward traverse, and means whereby the band-securing mechanism is actuated during said outward traverse.

7. In a grain-binder, the combination of a binding-table which receives the grain, a frame rocking on a horizontal pivot, a rising and falling binding-arm carried by said frame, band-securing mechanism, also carried by said frame, and a series of gear-teeth concentric with the axis of movement of said frame, whereby the band-securing devices are actuated as the frame rocks.

8. In a grain-binder, a frame rocking on a horizontal pivot, a rising and falling binding-arm carried by said frame, band-securing mechanism, also carried by said frame, and a shield located immediately above said band-securing mechanism.

9. In a grain-binder, the combination, with the grain table or receiver, of a frame rocking on a horizontal pivot, a cranked rock-shaft carried by said frame, a binding-arm mounted upon said rock-shaft, and a pitman connecting the wrist-pin of the rock-shaft with a rotating crank so arranged and timed as to depress the binding-arm at the termination of the inward traverse of the frame and elevate it at the termination of the outward traverse, while holding it substantially rigid with said frame between the two extremes.

10. The combination of the vertically rocking frame, the cranked rock-shaft mounted thereon, the binding-arm carried by said rock-shaft, the pitman attached to its wrist-pin, and the stop-motion by which said pitman is driven.

11. The combination of the vertically-rocking frame, the binding-arm carried thereon, and the cranks and pitman for actuating said arm, the band-securing device, also carried by the rocking frame, and the stationary segment for actuating it.

12. In a grain-binder, the combination, with the binding-arm and band-uniting devices, of a gate-actuating mechanism closing said gate to shut off the access of the band material to the band-uniting device during the rise and inward movement of the binding-arm, and means for opening it to admit said material as the arm descends and brings it around the gavel.

13. In a grain-binder, the combination, with a traversing binding-arm and concurrently-traversing band-uniting mechanism, of a gate traversing therewith, means to close said gate during the rise of the binding-arm and inward traverse to shut off the access of the band material to the band-uniting mechanism, and means to open it as the binding-arm descends and encircles the gavel, to admit said material.

14. The combination, with the band-uniting devices, of the bar or gate *g*, to admit or cut off access of the band material thereto, the trip by which said gate is opened, and the spring by which it is closed, substantially as described.

15. The tilting bar Z, supporting the binding mechanism, and means for operating it for changing the position of the binder relative to the delivery-point of the grain without changing the position of the binding parts relative to each other, substantially as specified.

16. The combination of the rocking receiver C with the main receiver B, substantially as and for the purposes specified.

17. The combination of the needle T with the twisting devices supported upon a tilting base adapted to tilt them in either direction, so as to bring the bands or ties in a proper position around the bundles, substantially as set forth.

18. The combination of the needle T, provided with an extension, U, with the cord W, spring V, pivoted arm R, and mechanism for controlling the latter, substantially as set forth.

19. The combination of the arm Q and pivoted bar R with the link or rod S, needle T, and cord W, for compressing the bundle, substantially as specified.

20. The combination of the needle T and frame M, N, O, and I′ with the crank *m*, pitman *n*, and post Y′, for advancing and receding the needle, substantially as specified.

21. The concave opening *i* in the twister-head Y, in combination with the close-fitting twisting-hook *e*, substantially as and for the purpose specified.

22. The combination of the wheel *d* and sliding bar *g* with the twisting-hook *e* and cutter *f*, for holding, twisting, and severing the wire, substantially as described.

23. The wheels H and I, in combination with the plate J, pitman K, crank L, and shaft M, for tilting the needle and forcing it through the grain, substantially as set forth.

24. The combination of the wheel H, provided with the cogged and blank sections, with the wheel I, similarly provided, pins *u u*, and plate J, for giving intermittent movements to the pitman K, substantially as specified.

25. The combination of the lever *s* with shaft J′ and pivoted binder-supporting bar Z, for tilting the binding apparatus in either direction, substantially as specified.

26. The combination of the lever *o* with the guide-post *q*, link *r*, tilting bar Z, upon which the binder is mounted, and lever *s*, for bringing the tilting within the control of the driver, substantially as specified.

27. The spring or yielding arm P, in combination with platforms B C, for preventing the return of the bundles, substantially as specified.

D. McPHERSON.

Witnesses:
BYRON ROGERS,
CHARLES COLAHAN.